United States Patent
Gilotte et al.

(10) Patent No.: US 10,220,891 B2
(45) Date of Patent: Mar. 5, 2019

(54) AERODYNAMIC SYSTEM WITH ORIENTABLE VORTEX GENERATOR

(71) Applicants: Philippe Gilotte, Benonces (FR); Yoann Eulalie, Lyons (FR)

(72) Inventors: Philippe Gilotte, Benonces (FR); Yoann Eulalie, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 20 days.

(21) Appl. No.: 15/545,009

(22) PCT Filed: Jan. 20, 2016

(86) PCT No.: PCT/FR2016/050105
§ 371 (c)(1),
(2) Date: Jul. 20, 2017

(87) PCT Pub. No.: WO2016/116698
PCT Pub. Date: Jul. 28, 2016

(65) Prior Publication Data
US 2018/0015969 A1 Jan. 18, 2018

(30) Foreign Application Priority Data
Jan. 21, 2015 (FR) .................... 15 50483

(51) Int. Cl.
*B62D 35/00* (2006.01)
*B62D 37/02* (2006.01)

(52) U.S. Cl.
CPC ............. *B62D 37/02* (2013.01); *B62D 35/00* (2013.01)

(58) Field of Classification Search
CPC ................................ B62D 35/00; B62D 37/02
USPC ........................................................ 296/180.1
See application file for complete search history.

(56) References Cited

U.S. PATENT DOCUMENTS

| 7,708,335 B2 * | 5/2010 | Wegener | B60T 1/16 296/180.1 |
| 2015/0321707 A1 * | 11/2015 | Menicovich | B62D 35/00 296/180.1 |

FOREIGN PATENT DOCUMENTS

| CN | 201520349 U | 7/2010 | |
| EP | 1506910 A1 * | 2/2005 | ........... B62D 35/007 |
| EP | 1632423 A1 * | 3/2006 | ........... B62D 35/007 |
| EP | 1873044 A1 | 1/2008 | |
| EP | 1740442 B1 | 3/2008 | |

(Continued)

OTHER PUBLICATIONS

International Search Report PCT/ISA/210 for International Application No. PCT/FR2016/050105 dated Apr. 22, 2016.

(Continued)

*Primary Examiner* — Pinel E Romain (74) *Attorney, Agent, or Firm* — Harness, Dickey & Pierce, P.L.C.

(57) ABSTRACT

Aerodynamic system for motor vehicle includes at least one vortex generator which generates a vortex by creating a periodic air jet able to be positioned downstream of at least one boundary layer separation region of at least one bodywork element of a vehicle, the boundary layer separation region generating a turbulent zone includes a shear layer and a main returning vortex, the vortex generator including at least one orientable nozzle able to generate vortices moving in a defined direction toward the shear layer and the main returning vortex, in a different plane from the shear layer.

20 Claims, 4 Drawing Sheets (56) References Cited

FOREIGN PATENT DOCUMENTS

| FR | 2896758 A1 | 8/2007 | |
|---|---|---|---|
| FR | 2931440 A1 | 11/2009 | |
| WO | WO-2011020818 A1 * | 2/2011 | ........... B62D 35/007 |

OTHER PUBLICATIONS

Written Opinion PCT/ISA/237 for International Application No. PCT/FR2016/050105 dated Apr. 22, 2016.
French Searh Report for French Application No. 1550483 dated Nov. 24, 2015.

* cited by examiner

AERODYNAMIC SYSTEM WITH ORIENTABLE VORTEX GENERATOR

CROSS-REFERENCE TO RELATED APPLICATIONS

This application is the U.S. National Phase application of PCT Application No. PCT/FR2016/050105 filed on Jan. 20, 2016, which claims priority to French Application No. 1550483 filed on Jan. 21, 2015, the contents of each of which are incorporated herein by reference in their entirety.

FIELD OF THE INVENTION

The invention relates to an aerodynamic system for motor vehicle.

BACKGROUND OF THE INVENTION

Motor vehicles in motion are subjected to various forces which oppose their advancement. These forces are in particular the solid friction forces, due to the contact of the wheels with the ground, and the aerodynamic forces, due partly to friction of the air on the vehicle bodywork panels, and partly to the pressure exerted mainly on the front and rear of the vehicle.

At high speed, these aerodynamic forces become dominant with respect to the other forces and play a major role on the energy consumption of the vehicle. Some of the aerodynamic forces are generated by the depressions created by the separations, the recirculations and the longitudinal vortices of the air at the rear of the vehicle Motor vehicles are therefore generally fitted with aerodynamic systems designed to facilitate the flow of air near the vehicle bodywork parts, more precisely to avoid the turbulence which generates a loss of energy and therefore, higher energy consumption by the vehicle.

It is known that this turbulence can be generated in the boundary layer separation regions marked by incidence breaks of vehicle bodywork parts. These breaks, also called trailing edges or boundary layer separation lines, correspond to breaks in the part shape (change of curve, projecting shape, end of part) leading to incidence breaks of the air flow relative to the panel. These boundary layer separation regions generate, downstream, turbulent zones where a depression is created when the vehicle is moving. This turbulent zone comprises a shear layer and a main returning vortex. Such zones are found for example near the upper rear end of the vehicle, formed by the transverse connection between the roof and the top of the tailgate, or near the rear window pillars or in the lower part of the rear bumper or at the rear bumper end caps. Turbulent or depression zones may also be found near the upper front end of the vehicle, formed by the transverse connection between the roof and the top of the windscreen, near the windscreen pillars, the front or rear wings or the bodywork parts around the front or rear wheel arches.

To improve the air flow in these turbulent zones, especially at the rear of the vehicle, an attempt is made to refine or extend these trailing edges by adapting the shape of the tailgate or the roof. Conventional systems consist mainly of spoilers, flaps or deflectors placed in these areas at the rear of the vehicle.

However, such parts do not eliminate the turbulence completely, and are relatively aesthetically restricting.

Aerodynamic devices are also known, from document EP1740442B for example, which consist of one or more fins forming at least one vortex generator and generally arranged upstream of a boundary layer separation line of a bodywork element of the motor vehicle. These fins can generally be moved between a retracted position and a projecting position in which they act on the turbulent structures generated around the bodywork elements of the vehicle.

However, such devices are faced with problems of size, appearance and integration on the bodywork elements. For example, the fins must always be retracted under certain conditions, which requires complex technical solutions to move the fins.

Moreover, while these fin systems are well suited when the angle of the boundary layer separation region is small, this is not the case when this angle is large. This angle is the angle defined by the break in the bodywork part shape, for example the angle between the roof and the rear window.

An aerodynamic system to limit losses in the shear layer is also known, from document EP 1 873 044 for example, without imposing special shapes on the bodywork parts. Such a system comprises electromechanical means arranged near a boundary layer separation region of the vehicle. These means are able to convert electricity into pressure waves in order to create a periodic air jet. This jet reduces the structures produced in the shear layer and decreases the intensity of the vortex produced downstream.

However, such a solution requires very precise positioning to be efficient, and is difficult to adapt to different types of vehicle and/or to different vehicle driving speeds.

OBJECT AND SUMMARY OF THE INVENTION

The invention aims to overcome these disadvantages by providing a more efficient aerodynamic system without imposing special shapes on the bodyworks parts, while maintaining efficiency regardless of the angle of the air boundary layer separation region.

Thus, the object of the invention relates to an aerodynamic system for a motor vehicle, comprising at least one vortex generator which is able to generates a vortex by creating a periodic air jet and is able to be positioned downstream of at least one boundary layer separation region of at least one bodywork element of a vehicle, generating a turbulent zone comprising a shear layer and a main returning vortex. The vortex generator comprises at least one orientable nozzle able to generate vortices moving according to a defined direction, toward the shear layer and the main returning vortex, in a plane different from the shear layer.

The system according to the invention can be positioned on any bodywork part of the vehicle, and on any type of vehicle. This system is also suitable when the angle of the boundary layer separation region is large.

According to the invention, the orientable nozzle is able to generate vortices entrained by the main vortex.

The orientable nozzle is preferably able to direct the air jet at, or substantially upstream of, the intersection between the shear layer and the main returning vortex.

According to one embodiment, the orientable nozzle comprises a means of rotation about an axis substantially parallel to the width of the shear layer.

Advantageously, the orientable nozzle comprises at least one slot from which an air jet able to generate said vortices exits, the dimensions and/or shape of said slot being defined according to the structure of the shear layer for a given vehicle speed.

The orientable nozzle can be orientable so as to adapt to a particular vehicle type. The orientable nozzle may also be orientable so as to adapt when driving to a change in the speed or attitude of said vehicle. The orientable nozzle can also be adapted to generate periodic air jets by oscillation around a chosen direction.

According to the invention, the vortex generator may comprise a vibrating means able to periodically send air into a diffuser, on which the orientable nozzle is mounted pivotally, the diffuser being sealed by means of a shell which closes the diffuser.

Preferably, the vortex generator is able to generate an air jet at a frequency substantially greater than the main transport frequency of the vortices in the shear layer.

According to an exemplary embodiment, the vibrating means comprises electromechanical means able to convert electricity into vibrating waves. These electromechanical means may comprise an overmolded film in a bodywork part of the vehicle.

Advantageously, the system may comprise a member for controlling the speed of the air jet at the outlet of the nozzle, the frequency at which the air jet is generated and the orientation of the air jet at the outlet of the nozzle.

According to an exemplary embodiment, the system may comprise a set of nozzles, the dimensions of each slot in the nozzles and/or the number of orientable nozzles being defined according to the structure of the shear layer for a given vehicle speed.

The invention also relates to an assembly of a motor vehicle bodywork part and at least one aerodynamic system according to the invention.

The bodywork part is preferably arranged in a region of incidence break of the vehicle.

The bodywork part can be selected from a set comprising a front or rear window pillar, a rear view mirror, a roof, a tailgate, a rear spoiler, a wing, an external part surrounding the wheels such as a bumper or a wing extension.

Lastly, the assembly according to the invention may comprise several aerodynamic systems.

BRIEF DESCRIPTION OF THE DRAWINGS

The invention will be better understood on reading the accompanying figures, which are given solely by way of example and not limiting in any way, in which:

FIGS. 5A and 5B show a section of an exemplary embodiment of the aerodynamic system according to the invention. In FIG. 5B, the nozzle is oriented at an angle of 30° relative to the nozzle of FIG. 5A.

MORE DETAILED DESCRIPTION

Figure 1:
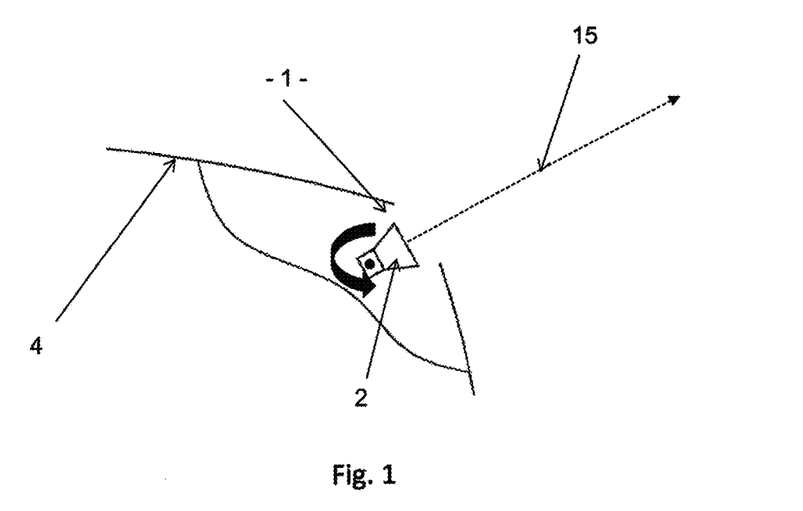
FIG. 1 is a diagram of an embodiment of the aerodynamic system according to the invention and its operation.
Figure 2:
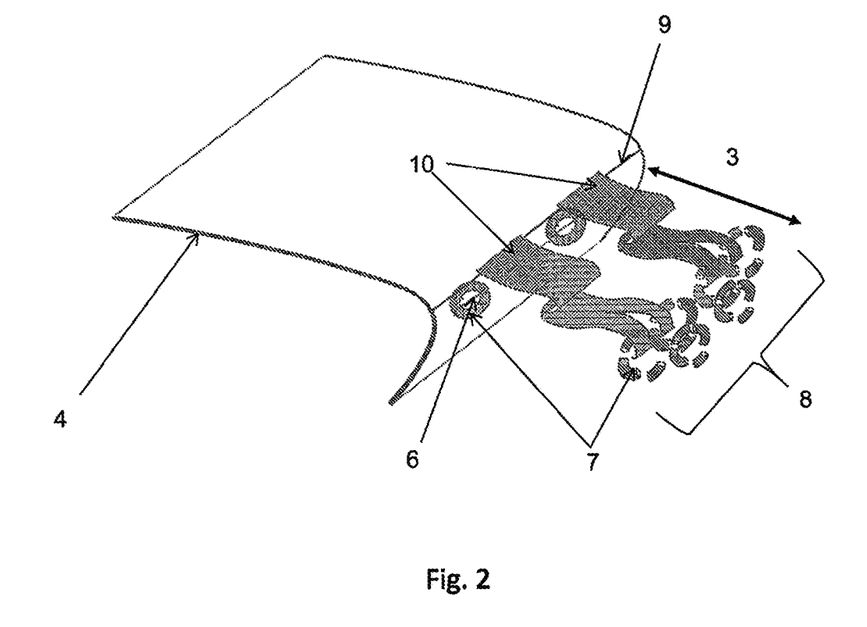
FIG. 2 schematizes the air flows at a rear spoiler of a motor vehicle.
Figure 3:
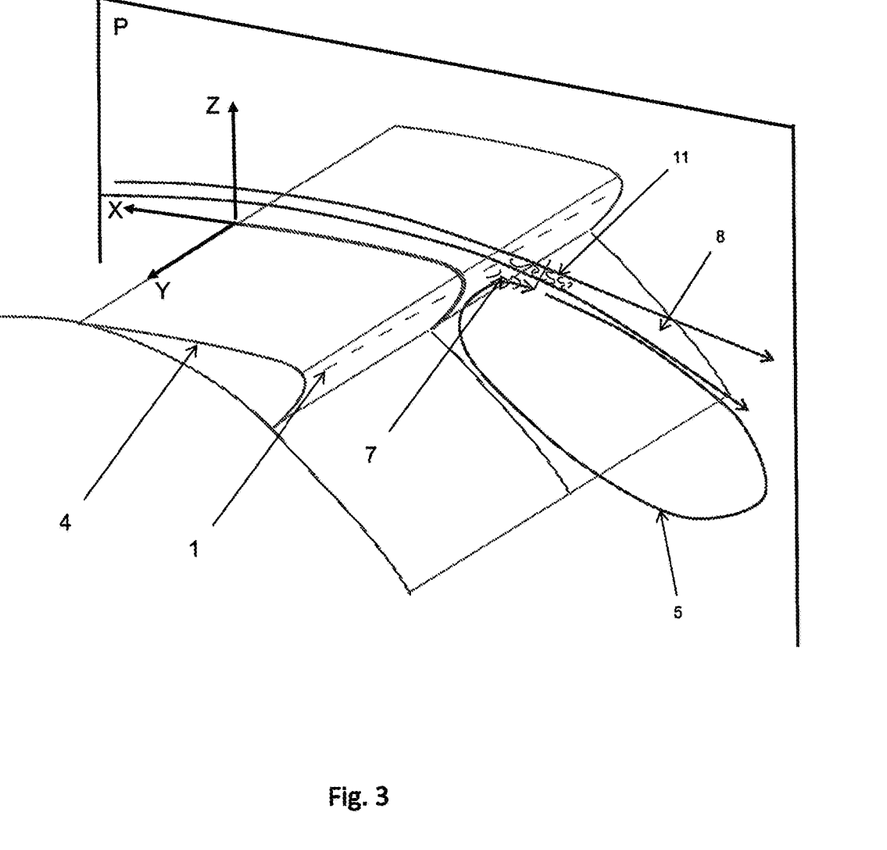
FIG. 3 illustrates the operation of the aerodynamic system according to the invention at a rear spoiler of a motor vehicle.

We now refer to FIGS. 1, 2 and 3, which illustrate an example of aerodynamic system (1) for motor vehicle according to the invention as well as its operation.

This system (1) comprises at least one vortex generator (2) which generates a vortex by creating a periodic air jet (15) able to be positioned downstream of at least one boundary layer separation region (9) of at least one bodywork element (4) of a vehicle. This boundary layer separation region generates downstream (in the direction of the air flow, i.e. from the front of the vehicle to the rear of the vehicle), a turbulent zone (3) comprising a shear layer (8) and a main returning vortex (5). The vortex generator (2) comprises at least one orientable nozzle (6) able to generate vortices (7) toward the shear layer (8) and the main returning vortex (5), in a plane different from the shear layer (8) (in a plane incident to the shear layer).

"Periodic air jets" designates a set of jets which are generated, whose speed varies over time with a given frequency. An air jet can be created by blowing only, by sucking only, by blowing and sucking, or by oscillation, i.e. by varying the angle of orientation of the nozzle (we speak of a nozzle oscillating about a given position). Thus, the vortex generator (2) is adapted to periodically create an air jet by creating a succession of blowing, of sucking, or a periodic combination of blowing and sucking.

We now refer to FIG. 2, which describes the flow of air at the rear of a vehicle in motion.

The air undergoes a separation at a boundary layer separation region (9), such as the rear spoiler for example. Following this separation, sheared air sheets (10) form which extend toward the rear of the vehicle. These sheets (10) form a shear layer (8) since the air speed (v+) at the top of the layer is greater than the air speed (v−) at the bottom of the layer.

A depression is created under this shear layer (8), causing a main returning vortex (5).

At a certain distance from the boundary layer separation region (9), vortices (11) appear in the shear layer (8) due to the differences in speed (v+, v−). These vortices (11) then destructure the sheared air sheets (10), which limits the pressure drop in the main returning vortex (5).

The sheets (10) interact with the main returning vortex (5), creating a pressure drop in the central vortex (5). When the pressure in the main returning vortex (5) is low, the aerodynamic forces at the rear of the vehicle increase, and therefore the vehicle consumption increases. The aim is therefore to increase the pressure of the main returning vortex (5).

To do this, the air sheets (10) must be destructured as soon as possible, i.e. as close as possible to the boundary layer separation region (9). In other words, the air sheets (10) must be destructured before the vortices (11) form in the shear layer (8).

To do this, and as illustrated on FIG. 3, the system (1) according to the invention is used, setting it so as to generate vortices (7) in the direction of air flow on the vehicle, i.e. towards the rear of the vehicle in the direction both of the shear layer (8) and of the main returning vortex (5), in a plane different from the vortices created in the shear layer (8).

If we consider that the shear layer (8) flows in a direction x, and has a width in a direction y, then the nozzle (6) is orientable by rotation about an axis substantially parallel to the direction y. The nozzle (6) can also be orientable by rotation about a z axis substantially perpendicular to the x and y axes. According to the example of FIGS. 1 to 4, the nozzle (6) is orientable about a substantially Y axis of the vehicle.

The system (1) according to the invention can be used to generate an air jet (15) in and around a defined optimum direction around which vortices (7) will form. These vortices (7) move in this optimum direction. This optimum direction makes the system more efficient than the previous systems.

An optimum direction is a direction allowing the vortices (7) generated around the air jet (15) leaving the nozzle and moving along this air jet (15) to be entrained by the main returning vortex (5).

Furthermore, it is preferred that these vortices (7) penetrate the shear layer (8) quickly rather than being entrained over a large section of the main vortex (5).

Thus, the optimum direction is preferably the direction in which the air jet (15) arrives at, or slightly upstream of, the intersection between the shear layer (8) and the main returning vortex (5).

Depending on the driving conditions, the air jet (15) along the optimum direction reaches the shear layer (8) tangentially. Depending on other driving conditions, the air jet (15) along the optimum direction cuts the shear layer (8).

To further improve the efficiency of the system (1), the system (1) can be used to generate structures (vortices (7) or set of vortices), whose shape and generation frequency allow better destructuring of the shear layer (8). These structures (vortices or set of vortices) are optimized by changing the size of the nozzles and/or the number of the nozzles, as well as the generation frequency of the air jets.

The orientable nozzle (6) comprises a slot from which an air jet (15) able to generate the vortices toward the shear layer (8) exits. A slot is an orifice of generally oblong shape. The slot has several dimensions. The largest of these dimensions is called the slot length.

The dimensions of this slot are defined according to the structure of the shear layer (8). More precisely, the dimensions, and in particular the length, of the slot are defined according to the frequency and size of the vortices (11) generated and transported in the thickness of the shear layer (8) downstream of the boundary layer separation line (9), and for a given vehicle speed. According to the examples illustrated on the figures, the slots are parallel to the Y axis of the vehicle. According to other embodiments, the slots may have other orientations. In particular, they may be parallel to the Z axis of the vehicle.

Preferably, the system (1) comprises several orientable nozzles (6). In this case, the dimensions of each slot of the nozzle (6) and/or the number of orientable nozzles (6) are defined according to the frequency of the vortices (11) in the shear layer (8) and the thickness (in the substantially Z direction of the vehicle) of the shear layer (8) just downstream of the boundary layer separation line (9), and for a given vehicle speed.

The number of systems (1) also depends on the dimension of the system (1) along the Y axis of the vehicle and the shape and dimension of the bodywork part (4), therefore the width of the shear layer (8). Indeed, it may be necessary, to follow the curve of the bodywork part (4), to increase the number of systems (1). The number of systems is therefore a compromise between reducing the dimension of the system (1) and the number of systems (assembly complexity and costs). For example, several 4 cm systems can be used to match the curve of a 2 m wide spoiler.

For example, the greater the frequency of the vortices, the larger the slot width and/or the greater the number of nozzles (6) in the system (1), and the greater the thickness of the shear layer, the larger the slot and the greater the number of nozzles (6) in the system (1).

Thus, each nozzle (6) is not only orientable, but also due to the adaptation of the slot dimensions and shape, adapted to the separation width and to the structure of the shear layer (8).

Figure 4:
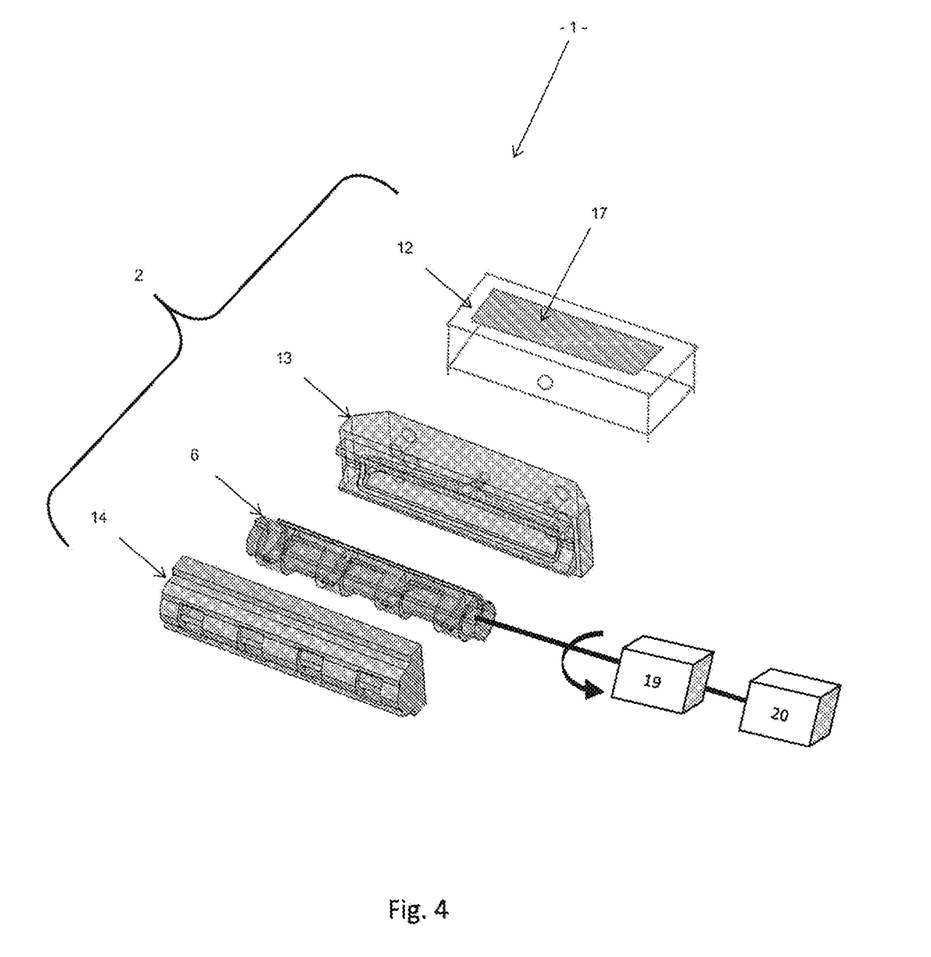
FIG. 4 illustrates an exemplary embodiment of the aerodynamic system according to the invention.

According to the embodiment of FIG. 4, the vortex generator (2) comprises a vibrating means (12) able to periodically send air into a diffuser (13), on which the orientable nozzle (6) is mounted movably in rotation between two angular positions, a minimum position and a maximum position. The assembly formed by the diffuser (13) and the shell (14) forms a sealed housing around the nozzle.

The vibrating means (12) is able to generate air jets (15) at a given frequency, for example at the frequency at which the vortices (11) appear in the shear layer (8). Vortices (7) are then generated around the air jet (15) in the direction of the air jet (15).

According to one embodiment, the vibrating means (12) comprises electromechanical means able to convert electricity into vibrating waves. Preferably, these electromechanical means comprise an overmolded film (17) in a bodywork part of the vehicle or in a housing able to be integrated in this part.

The electromechanical means comprise for example a loudspeaker (18). They may also include piezoelectric means, for example a piezoelectric plastic overmolded film in a bodywork part or in a separate housing.

The electromechanical means can be obtained by overmolding a semiconductor film.

The electromechanical means may comprise electroactive polymers, preferably in the form of an overmolded dielectric elastomer film in the bodywork part.

Figure 5A:
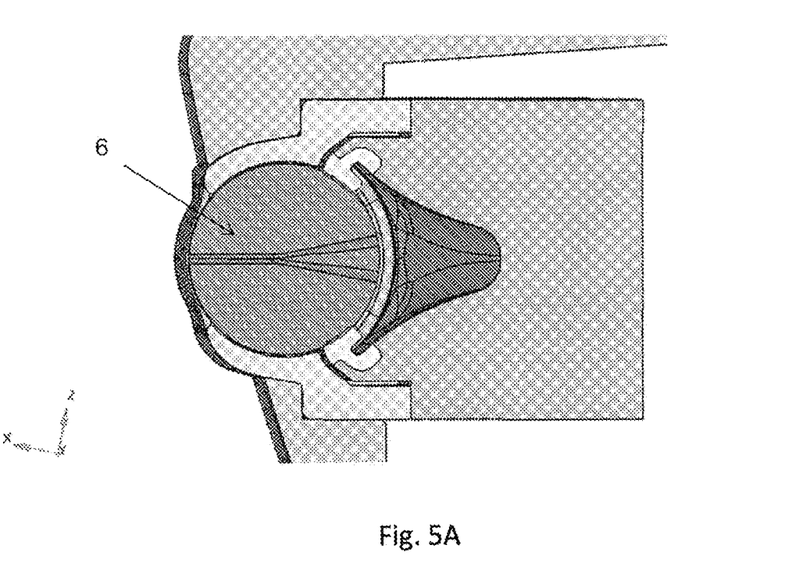
Figure 5B:
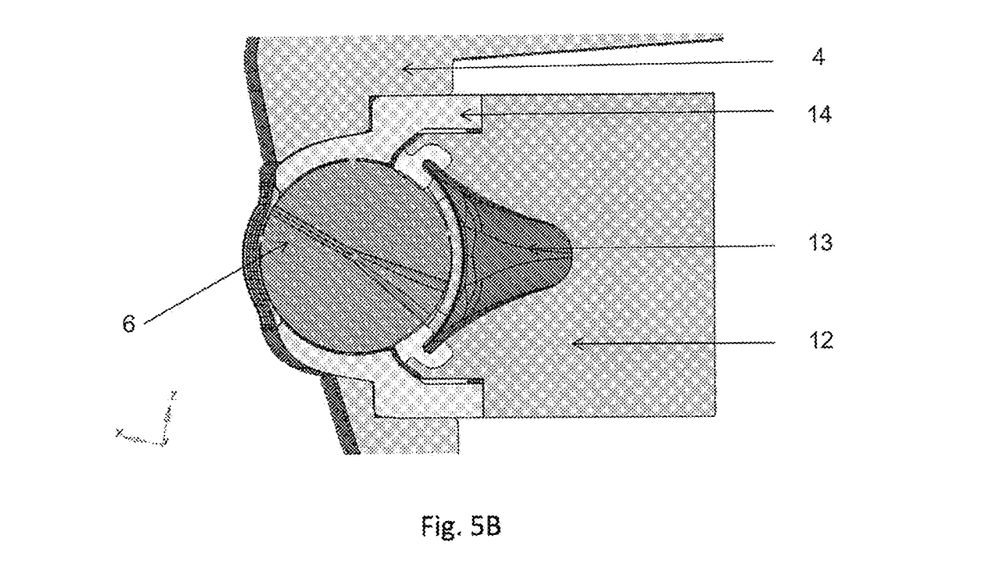

The orientable nozzle (6) is actuated angularly by a means of rotation (19) about a substantially Y, and optionally X, axis of the vehicle. This means of rotation (19) is used to incline the nozzle (6) relative to the shear layer (8) and the main returning vortex (5), in a range of predefined angles. The range of angles (see FIG. 1) allows the air jet (15) to be oriented in the previously defined optimum direction. FIGS. 5A and 5B show a section of an exemplary embodiment of the aerodynamic system according to the invention. In FIG. 5B, the nozzle is oriented at an angle of 30° relative to the nozzle of FIG. 5A.

According to one embodiment, the system (1) comprises a member (20) for controlling the speed of the air jet (15) at the outlet of the nozzle (6), the frequency at which the air jet (15) is generated and the orientation of the air jet (15) at the outlet of the nozzle.

The speed and frequency are used to manage the structure and size of the vortices (7).

The control member (20) can operate in at least one of the following modes:

According to a first embodiment, the angle of orientation of the nozzle (6), the frequency of generation of the air jets (15), and the speed of the air jets (15) of the system (1) are predetermined and preset for a given configuration of a given vehicle. For example, the configuration corresponding to the maximum speed of economic operation mode can be used. Afterwards, the system (1) can no longer be adjusted, it is said to be static as opposed to the dynamic mode below.

According to a second embodiment, the system (1) is dynamic, i.e. the angle of orientation of the nozzle (6) and the frequency of generation of the air jets (15) and the speed of the air jets (15) can change depending on the use of the vehicle. The program used to make such changes can be preset during development by driving tests in different configurations in order to determine behavior laws.

According to a third embodiment, the system (1) is intelligent: it configures itself depending on the vehicle type, driving style and driving conditions. Thus, the inclination of the nozzle (6) is adjusted while driving, so that the air jets (15) are always oriented in the optimum direction. The nozzle (6) therefore adapts to a change of speed of the vehicle for example. The speed of the air jet (15) and the frequency of the air jets (15) are also defined for each variation of the driving conditions, for example the vehicle attitude.

In conclusion, the aerodynamic system (1) according to the invention comprises various adjustment means used to destructure the shear layer (8) as close as possible to the boundary layer separation line:
- the orientation of the nozzle (static or dynamic operation or by oscillation about an optimum direction);
- the orientation of the nozzle slot;
- the shape of the slot, including its dimensions;
- the speed of the air jet;
- the frequency of the air jet.

The invention also relates to an assembly (21) of a motor vehicle bodywork part (4) and an aerodynamic system (1) according to the invention.

The bodywork part (4) is arranged in a zone of incidence break of the vehicle and is preferably selected from a set comprising a front or rear window pillar, a rear view mirror, a roof, a tailgate, a rear spoiler, a wing, an external part surrounding the wheels such as a bumper or a wing extension.

According to a preferred embodiment, the assembly (21) comprises several systems (1) according to the invention, positioned discontinuously and whose number depends on the radius of curvature of the boundary layer separation region (9).

According to one example, the bodywork part (4) is a rear spoiler, and the aerodynamic systems (1) are distributed over the entire width of the vehicle on the spoiler.

The invention claimed is:

1. An aerodynamic system for a motor vehicle, the system comprising:
   at least one vortex generator configured to generate a vortex by creating a periodic air jet and positioned downstream of at least one boundary layer separation region of at least one bodywork element of a vehicle, said boundary layer separation region being configured to generate a turbulent zone and includes a shear layer and a main returning vortex;
   wherein said at least one vortex generator includes at least one orientable nozzle configured to generate vortices moving in a defined direction toward the shear layer and the main returning vortex, in a plane that is different from the shear layer.

2. The system according to claim 1, wherein the orientable nozzle is configured to generate vortices entrained by the main vortex.

3. The system according to claim 1, wherein the orientable nozzle is configured to direct the air jet at, or substantially upstream of, the intersection between the shear layer and the main returning vortex.

4. The system according to claim 1, wherein the orientable nozzle comprises:
   a means of rotation about an axis that is substantially parallel to the width of the shear layer.

5. The system according to claim 1, wherein the orientable nozzle comprises:
   at least one slot from which an air jet able configured to generate said vortices exits, dimensions and/or shape of said slot based on a structure of the shear layer for a given vehicle speed.

6. The system according to claim 1, wherein the orientable nozzle is orientable and configured to adapt to a particular vehicle type.

7. The system according to claim 1, wherein the orientable nozzle is orientable and configured to adapt when driving to a change in speed or attitude of said vehicle.

8. The system according to claim 1, wherein the orientable nozzle is configured to generate periodic air jets by oscillation around a chosen direction.

9. The system according to claim 1, wherein the vortex generator comprises:
   a vibrating means configured to periodically send air into a diffuser, on which the orientable nozzle is mounted pivotally, the diffuser being sealed by a shell which closes the diffuser.

10. The system according to claim 1, wherein the vortex generator is configured to generate an air jet at a frequency that is substantially greater than a main transport frequency of the vortices in the shear layer.

11. The system according to claim 9, wherein the vibrating means comprises:
    electromechanical means configured to convert electricity into vibrating waves.

12. The system according to claim 11, wherein the electromechanical means comprise an overmolded film in a bodywork part of the vehicle.

13. The system according to claim 1, further comprising:
    a member configured to control the speed of the air jet at the outlet of the nozzle, the frequency at which the air jet is generated and the orientation of the air jet at the outlet of the nozzle.

14. The system according to claim 1, further comprising:
    a set of nozzles, the dimensions of each slot in the nozzles and/or the number of orientable nozzles being based on the structure of the shear layer for a given vehicle speed.

15. An assembly of a motor vehicle bodywork part and at least one aerodynamic system according to claim 1.

16. The assembly according to claim 15, wherein the bodywork part is in a region of incidence break of the vehicle.

17. The assembly according to claim 16, wherein the bodywork part is selected from a set comprising a front or rear window pillar, a rear view mirror, a roof, a tailgate, a rear spoiler, a wing, and an external part surrounding the wheels including a bumper or a wing extension.

18. The assembly according to claim 16, comprising several aerodynamic systems.

19. The system according to claim 1, wherein the orientable nozzle comprises:
    a rotator configured to rotate about an axis that is substantially parallel to the width of the shear layer.

20. The system according to claim 1, wherein the vortex generator comprises:
    a vibrator configured to periodically send air into a diffuser and on which the orientable nozzle is mounted pivotally, the diffuser being sealed by a shell which closes the diffuser.

* * * * *

UNITED STATES PATENT AND TRADEMARK OFFICE
CERTIFICATE OF CORRECTION

PATENT NO. : 10,220,891 B2
APPLICATION NO. : 15/545009
DATED : March 5, 2019
INVENTOR(S) : Philippe Gilotte and Yoann Eulalie

Page 1 of 1

It is certified that error appears in the above-identified patent and that said Letters Patent is hereby corrected as shown below:

On the Title Page

Item [73], insert:
--Compagnie Plastic Omnium, Lyon (FR)--

Signed and Sealed this
Seventh Day of May, 2019

Andrei Iancu
*Director of the United States Patent and Trademark Office*